March 3, 1953　　A. KLEIJN ET AL　　2,630,392
TREATMENT OF FLOUR AND SIMILAR GROUND PRODUCTS
Filed Aug. 22, 1950
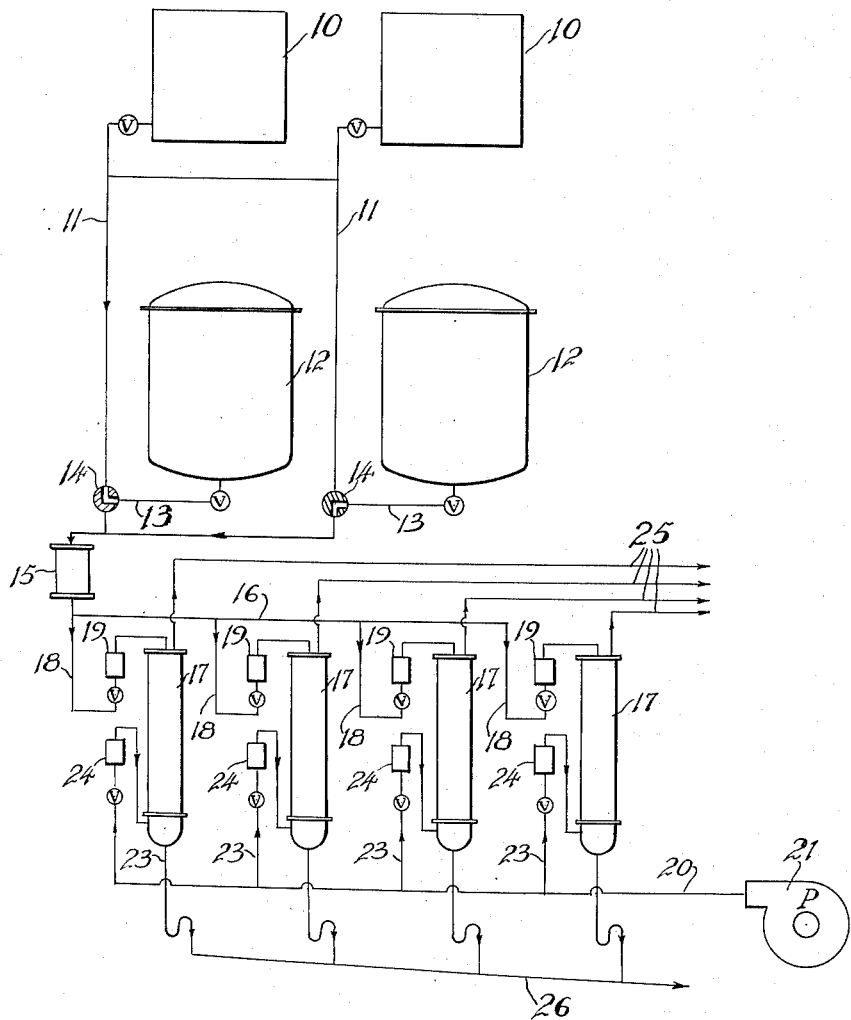
INVENTOR.
Adrianus Kleijn
BY Hendrikus Jacobus Houtgraaf
Pollard & Johnston
ATTORNEYS Patented Mar. 3, 1953

2,630,392

UNITED STATES PATENT OFFICE 2,630,392

TREATMENT OF FLOUR AND SIMILAR GROUND PRODUCTS

Adrianus Kleijn and Hendrikus Jacobus Houtgraaf, Rotterdam, Netherlands; said Houtgraaf assignor to said Kleijn Application August 22, 1950, Serial No. 180,892
In the Netherlands August 31, 1949

5 Claims. (Cl. 99—232)

This invention relates to improvements in the treatment of flour and similar ground products with chlorine dioxide.

Though it has been known for a long time that chlorine dioxide has a favourable influence on the colour and baking properties of flour and similar ground products, until recently it has only been applied to a small extent for the said purpose, as its preparation and especially the measuring out of correct quantities, met with great difficulties. On account of the fact, however, that in recent years technically applicable methods for the manufacture of chlorine dioxide have been developed, the said substance now begins to find a wider application in the said field.

However, the systems hitherto known for the treatment of flour with chlorine dioxide still involve serious drawbacks. When treating ground products the measuring out of the chlorine dioxide (in general about one gram of chlorine dioxide each 100 kilos of flour) must be capable of exact control, as excessive quantities may be detrimental.

In most systems chlorine dioxide is formed by reaction of certain substances in solution; an inert gas is passed through the solution during the reaction and entrains the chlorine dioxide along with it.

The reaction between the substances which are intended to generate chlorine dioxide, however, is accompanied by several side reactions, the extent of which depends to a large extent on the conditions under which the reaction takes place.

Thus the quantity of chlorine dioxide generated from a given quantity of raw material is uncertain. In addition the quantity of chlorine dioxide carried away from the solution by the stream of gas depends on several factors, such as the temperature of the solution, and the concentration of the chlorine dioxide in the solution. Thus it is clear that under the conditions mentioned the content of chlorine dioxide in the gas-stream and consequently the quantity of the chlorine dioxide supplied per unit of time is uncertain.

The determination of the quantity of chlorine dioxide in the gas-stream with which the ground products are treated is very difficult under the normal working conditions in a flour mill, so that in general it is omitted. Moreover such determinations would have to be carried out at short intervals, if they were to have any real effect. Thus in practice any deviations are as a rule discovered too late.

A further drawback of the methods hitherto known consists in that extensive measures are necessary to prevent a risk of explosion.

According to the present invention the measuring out of the chlorine dioxide for the treatment of flour and similar ground products does not take place in the form of a gas-stream but in the form of a solution. For this purpose a pre-prepared aqueous solution containing the chlorine dioxide is supplied to the degassing apparatus in measured quantities; only after this measuring out is the chlorine dioxide carried away from the solution by a stream of an inert gas (e. g. air) and the ground product is treated by this gas-stream.

A great advantage of this process is that it is easy to determine the quantity of chlorine dioxide present in the solution, so that by proportioning the quantity of solution in relation to this content of chlorine dioxide the latter substance is automatically also proportioned and no uncertainty exists as to the quantity of chlorine dioxide with which a particular ground product is treated. The accuracy of the liquid measuring instrument can, if desired, easily be verified by collecting the liquid in a graduated glass for a period, e. g. a minute.

The degassing of the solution already supplied in measured quantity does not involve any appreciable difficulties. The quantity of carrier gas (such as air) used for the operation need not be accurately constant, since the quantity of chlorine dioxide drawn off per unit of time only depends, within certain limits, on the quantity and the concentration of the chlorine dioxide solution, all these factors being known.

Preferably dilute aqueous solutions of chlorine dioxide are used. In this connection the term "dilute solutions" is used to refer to solutions, which have such a vapour tension of chlorine dioxide at the temperature at which they are handled, for example, at room temperature, that the risk of explosion is eliminated. When more concentrated solutions are used, which might involve a risk of explosion the construction of the apparatus should be such as to provide against this risk.

Highly suitable solutions for practical use are dilute aqueous solutions containing 15 grams of chlorine dioxide or less per litre of solution, for example, 5–15 grams of chlorine dioxide per litre.

Such dilute aqueous solutions are sufficiently stable, so that it is only necessary to prepare same at intervals, e. g. of 24 hours. Thus no permanent supervision in the preparation is necessary. The solutions can simply be taken from a storage tank.

When the chlorine dioxide produced is to be distributed over a number of places where it is to be used, as is often the case, the process according to the invention offers still more advantages.

In medium- and large-sized flour mills it is customary to segregate the total flour obtained in the various stages of the milling process into a number of separate groups or grades.

In group I, for example, 35 per cent of the total production in the form of flour with a good colour and a low ash content is combined, in group II, 55 per cent of the production with a slightly darker colour and a higher ash content, and finally, in group III, 10 per cent with a very dark colour and a high ash content. The distribution over these groups of the flour produced from time to time may be varied, if variation in the quality of the grain or in the demands made on the product render this necessary. Generally these groups are, in part or in whole, subsequently again combined.

When the flour is treated with gaseous substances, such as nitrogen dioxide, nitrogen trichloride or chlorine dioxide, with a view to improving its colour or baking properties, it is essential that each group be treated with the correct quantity of such gaseous substance. In general the group with the highest ash content requires the strongest treatment, and it is common knowledge that even if the flour is combined again later, this differentiated treatment yields far and away the best results.

In the method of distribution of the chlorine dioxide over the several groups hitherto applied the measuring out of the chlorine dioxide again took place by means of dividing the gas-stream.

The pressure at the entrance to the distributing system depends, however, on the resistance of the said system, on the resistance of the tubes leading to the places where the treatment is to take place, e. g. screw conveyors and on any excess or deficiency in the pressure in the places, e. g. in said screw conveyor system, to which the gas is supplied. Any variation (desired or undesired) in the rate of passage through one particular group will necessitate adjustment of the rates for all the other groups, and this renders the regulations of such a gas-distributing system very laborious, especially when the number of distributing points is rather large. Further, small periodic variations of the air pressure in the screw conveyor system will often give rise to inconvenient fluctuations in the indications of the measuring instruments.

In contradistinction thereto the control of the separate groups can take place independently one of the other by applying the method according to the invention viz. by measuring out the chlorine dioxide in the form of a solution, as the pressure at the entrance to the distributing system is only dependent on readily controllable factors, such as the level in the storage tank or on any level-controlling apparatus and no longer on the quantities taken for the different groups. The influence of any small variations in pressure in the various degassing-apparatus on the supply can be neutralized by very simple means, e. g. by a siphon in the tube carrying the liquid to the degassing-apparatus.

The preparation of the chlorine dioxide solutions can be carried out in various ways which are known in themselves, so that they need not be described in detail. Very suitable is, for example, the reaction of a chlorite with a strong acid.

The following examples illustrate the invention:

Example I

A chlorine dioxide solution is prepared by adding 0.2 mol of hydrochloric acid per litre, in the form of concentrated hydrochloric acid, to an 0.2 molar sodium chlorite solution. After a few hours at room temperature this solution has been completely converted and then contains 7 grams of chlorine dioxide per litre. This solution is passed to a degassing-column at a rate for example, of 5 litres per hour, via a regulating cock and a rotameter. In this degassing-column the chlorine dioxide is removed from the solution by a current of air, for example of 7 m.$^3$ per hour and carried to the place where the flour is treated. This gas-stream carries 35 grams of chlorine dioxide per hour and the concentration is 5 grams of chlorine dioxide per m.$^3$.

Example II

A chlorine dioxide solution is prepared as in Example I. This solution is passed to a distributing system, by means of which the quantity of solution required per unit of time for each flour group to be treated individually is measured out. This distributing system comprises a manifold having a number of regulating cocks corresponding to the number of flour groups to be treated individually. In this way a number of currents of liquid are supplied in measured quantity. Each of these currents of liquid is supplied to a separate degassing apparatus, in which the chlorine dioxide is removed from the solution by a current of air. This current of air passes the chlorine dioxide to the screw conveyors through which the flour group to be treated is passed.

Behind each regulating cock a liquid-measuring instrument is preferably arranged, so as to make possible a ready control of the supply of the solution by the regulating cock.

The process of the present invention may be carried out in the diagrammatically represented apparatus illustrated in the accompanying drawing. With reference to this drawing the required chemicals are separately dissolved in tanks 10 and the solutions flow through the conduits 11 into one of the storage tanks 12, where the reaction takes place. These tanks 12 are provided in duplicate for alternate use such that a continuous supply of chlorine dioxide solution may be obtained, and each tank may be of a capacity to hold a supply for twenty-four hours' requirements.

The storage tanks 12 are connected through conduites 13 having switch valves 14 therein to a constant level tank 15 and thence to a manifold conduit 16 from which the stream of aqueous solution is diverted to the respective degasifying columns 17 by means of branch conduits 18. Each branch conduit contains a valve as shown and a liquid metering device 19.

A source of air is provided by a blower 21 connected to a manifold 20 in turn connected through branch conduits 23 to the bottoms of the degasing towers 17. Each of these branch conduits is provided with a valve as shown and an air flow meter 24. In passing through the degasing towers, the air takes up the chlorine dioxide from the solution and the resulting chlorine dioxide-air mixture flows from the top of the degasing towers through conduites 25 connecting to the screw conveyors (not shown) in which the flour is agitated and contacted with the chlorine dioxide gas. Suitable valves or cocks are provided in the various liquid and gas lines where needed to control the flow.

What we claim is:

1. In the continuous treatment of flour and similar ground products with chlorine dioxide gas, the improvement which comprises, preparing an aqueous solution of chlorine dioxide of known concentration, metering a stream of said solution calculated to provide the amount of chlorine dioxide required for proper alteration of the particular product at hand, flowing an inert gas through the resulting metered aqueous stream in a quantity which takes up the chlorine dioxide and flowing the resulting chlorine dioxide-gas mixture into contact with the product to be treated.

2. In the continuous and simultaneous treatment of flour and similar ground products with chlorine dioxide gas, in a plurality of grades of different color and ash content requiring chlorine dioxide in quantities separately measured for each grade, the improvement which comprises, preparing an aqueous solution of chlorine dioxide of known concentration, establishing a plurality of streams of the said solution in a number corresponding to the number of grades to be treated, metering the respective streams of solution to provide required chlorine dioxide dosage for the respective grades, flowing the metered streams through individual degassing devices while passing a current of inert gas through each device in a quantity which takes up the chlorine dioxide, conducting the resulting gaseous streams of chlorine dioxide-gas mixtures through and in contact with the respective grades whereby each grade is treated with the required quantity of chlorine dioxide gas.

3. Process as claimed in claim 1, wherein a dilute aqueous solution of chlorine dioxide is used.

4. Process as claimed in claim 1, wherein an aqueous solution containing 5–15 grams of chlorine dioxide per liter is used.

5. Process as claimed in claim 2, wherein an aqueous solution containing 5–15 grams of chlorine dioxide per liter is used.

ADRIANUS KLEIJN.
HENDRIKUS JACOBUS HOUTGRAAF.

REFERENCES CITED

The following references are of record in the file of this patent:

UNITED STATES PATENTS

| Number | Name | Date |
|---|---|---|
| 2,324,203 | Ferrari | July 13, 1943 |
| 2,379,335 | Baker | June 26, 1945 |
| 2,478,043 | Evans | Aug. 2, 1949 |

FOREIGN PATENTS

| Number | Country | Date |
|---|---|---|
| 829,227 | Australia | May 1928 |

OTHER REFERENCES

Kent-Jones: Modern Cereal Chemistry, Northern Pub. Co., Ltd., Liverpool, 1947, pages 246–247.